(12) United States Patent
Wu

(10) Patent No.: US 9,385,395 B2
(45) Date of Patent: Jul. 5, 2016

(54) CONTINUOUS PRISMATIC CELL STACKING SYSTEM AND METHOD

(75) Inventor: Yang Wu, Honolulu, HI (US)

(73) Assignee: MICROVAST, INC., Stafford, TX (US)

( * ) Notice: Subject to any disclaimer, the term of this patent is extended or adjusted under 35 U.S.C. 154(b) by 120 days.

(21) Appl. No.: 13/820,679

(22) PCT Filed: Oct. 13, 2011

(86) PCT No.: PCT/US2011/056225
§ 371 (c)(1),
(2), (4) Date: Mar. 4, 2013

(87) PCT Pub. No.: WO2012/054312
PCT Pub. Date: Apr. 26, 2012

(65) Prior Publication Data
US 2013/0160283 A1    Jun. 27, 2013

Related U.S. Application Data

(60) Provisional application No. 61/394,284, filed on Oct. 18, 2010.

(51) Int. Cl.
*H01M 10/04* (2006.01)
*H01M 10/0525* (2010.01)

(52) U.S. Cl.
CPC .......... *H01M 10/04* (2013.01); *H01M 10/0404* (2013.01); *H01M 10/0436* (2013.01); *H01M 10/0525* (2013.01); *Y02T 10/7011* (2013.01); *Y10T 29/49108* (2015.01); *Y10T 29/53135* (2015.01)

(58) Field of Classification Search
CPC .......................................... H01M 10/04–10/049
USPC ......................................................... 29/623.1
See application file for complete search history.

(56) References Cited

U.S. PATENT DOCUMENTS

| 4,479,300 A * | 10/1984 | Savage ......................... 29/623.1 |
| 2002/0007552 A1* | 1/2002 | Singleton et al. ............ 29/623.3 |

* cited by examiner

*Primary Examiner* — Nicholas P D'Aniello
(74) *Attorney, Agent, or Firm* — Baker & McKenzie LLP

(57) ABSTRACT

A continuous prismatic cell stacking system and method is disclosed. The system comprises: (a) devices on the system to supply a separator layer, a cathode layer, and an anode layer; and (b) one cutter on the frame for cathode layer and anode layer; and (c) conveyer system to convey the stacked cell. The conveyer system comprises a rotary disc and a transfer belt. The said rotary disc is round shape, or multi-equilateral shape, or track & field shape.

17 Claims, 3 Drawing Sheets

CONTINUOUS PRISMATIC CELL STACKING SYSTEM AND METHOD

CROSS-REFERENCE TO RELATED APPLICATIONS

This application is a U.S. National Phase Entry pursuant to 35 U.S.C. §371 of PCT/US2011/056225, filed Oct. 13, 2011, which claims priority to U.S. Provisional Application Ser. No. 61/394,284, filed Oct. 18, 2010, the disclosures of which are incorporated herein in their entirety.

FEDERALLY SPONSORED RESEARCH STATEMENT

Not applicable.

FIELD OF THE INVENTION

This invention relates generally to a continuous prismatic cell stacking system and a method for the rapid manufacturing of prismatic cells in a large size format. More specially, the system and method is able to successively stack the separator layer/cathode layer/separator layer/anode layer/separator layer (S-C-S-A-S) pattern for a lithium ion secondary cell.

BACKGROUND OF THE INVENTION

In general, lithium ion (Li-ion) batteries are principally used in consumer electronic devices such as lap-top computers, cell phones, cameras, camcorders and MP3 players. Li-ion batteries used in the above-mentioned devices can be made in a single electrochemical cell or multi cells in series or parallel dependent upon power consumption needs. Lap-top computer batteries usually include four to nine individual cells per pack. The cells used in these devices are typically small in capacity (<2 ampere hour (Ah) typically). Cells used in consumer electronic devices are typically of a wound electrode configuration. The structure is a long narrow sandwich having cathode layer/separator layer/anode layer/separator layer that is spiraled on a mandrel forming a "jelly roll" monolithic structure. The jelly roll can be processed in the following ways:

(1) The jelly roll may be a tight spiral wind that is subsequently placed in a cylindrical can for further processing—i.e. 18650 and 26650 standard size round cells used in lap-top computers and power-tools. Here, "18" means that the can is 18 mm in diameter, and "65" means that the can is 65 mm in height. "0" has no meaning here.

(2) The jelly roll may be a compressed flattened jelly roll that is subsequently placed in a plastic pack as is typically used in cell phone batteries, MP3 players and like sized devices.

The wound format lends itself to the rapid construction of the electrode/separator mass and the large scale automation of the fabrication process. Typically, the electrode/separator mass can be wound in a few seconds (approximately 2). A single automated machine can construct millions of these cell structures in a typical operation over a short period of time. To date, 18650 and 26650 wound Li-ion cells are in large quantity production mode and have an electrochemical capacity often less than 4 Ah depending on cell design and the electrode material chosen. The wound cell design for large capacity power needs is not practical for a few reasons, including the processing practicality to maintain concentricity of all the wound electrodes and safety concerns due to thermal management issues when the battery is in a high rate charge or discharge mode.

While cells of less than 4 Ah capacity are typically of a wound based construction, the large capacity cells ("large format" cells) are of a stacked construction where the electrode/separator mass includes of a number of alternating layers of separator/cathode (or anode) electrode/separator/anode (or cathode) electrode with this stacking arrangement repeating a number of times (e.g., 25 to 50) to reach the desired cell capacity according to the cell design and specification.

Current processes for stacking large format cells depend on manual hand stacking or the use of a stacking machine that accommodates provisions for the automatic laying of the alternate layers of the electrode/separator mass.

The process of manual hand stacking cannot ensure the precision of the stacking process, and cannot ensure the quality of the stacking cells.

Current stacking equipment requires that each cathode and anode electrode layer must be cut to its size and shape in a separate process. Due to its thinness and propensity to acquire a static electrical charge during handling, a special machine must be provided to cut or fold the separator material (e.g., –Z fold). The electrode layers are placed onto their respective alternating layers using a pick-and-place technique whereby a single machine device (e.g., an arm) will pick-up a single electrode layer and deposit it upon the cell stack. Typically the electrode is held onto the pick-up device via a reduced air pressure (vacuum) applied at the point of contact of the device and the electrode surface. The action of picking-up and depositing an electrode upon the stack occurs over the course of a few seconds (about 2 to about 5). In the case of a typical 25 composite electrode layer cell, the stacking will take from about 2 to about 5 minutes to complete. Thus, an automated manufacturing system for a layered cell having an improved structure and a manufacturing process that simplifies and enhances assembling efficiency in a continuous process is needed.

SUMMARY OF THE INVENTION

It is an objective of the current invention to provide a continuous prismatic cell stacking system and method to solve the problems mentioned above. This method and system can rapidly produce large format prismatic cells as part of the overall battery manufacturing process. The method and system provide:

means to cut variable size and shape for individual electrode layers means to cut variable size and shape for separator layer means to handle the thin and prone to static charge of separator layer means to maintain tight tolerance with regard to positioning and retaining position of electrode layers and separator layer within the stacking process means of stabilizing the electrode stack in terms of the undesirable shifting or repositioning of stack layers following the completion of the stacking process and subsequent handling to complete the cell construction means to feed electrode and separator stock layers to the cutting sub-process such that contact to separator and electrode surfaces is eliminated or minimized with respect to current methods.

In order to achieve the above-mentioned objectives, the current invention provides a continuous prismatic cell stacking system, comprising:

(a) a rotary disc system, wherein the rotary disc is round shape, or multi-equilateral shape, or track & field shape;

(b) successively stacking said separator layer/cathode layer/separator layer/anode layer/separator layer so that each layer is supported in turn while it is being conveyed at high speed on the said rotary disc;

(c) engaging a cathode spool, separator spool, anode spool, and separator spool for stacking prismatic cells so that each separator layer, cathode layer, separator layer, anode layer, and separator layer can be placed on top of each other while being conveyed at high speed on the said rotary disc. The layer pattern is designed to have two separator layers at each end. In a preferred embodiment, a separator layer is between the cathode layer and the anode layer;

(d) engaging holders for each separator layer, cathode layer, and anode layer to push and place the said layer to pre-set or pre-designated positions and locations;

(e) engaging a clamp for each separator layer, cathode layer, and anode layer to stabilize the layers at the pre-set or pre-designated positions and locations;

(f) engaging a cutter for each cathode layer and anode layer;

(g) engaging a rotary heating device located at the side of rotary disc that can heat and seal the separator layers; and (h) engaging a transfer belt to move the stacked cell to the next process.

In another aspect, the current invention includes a prismatic cell stacking system comprising a rotary disc to support each one of a plurality of separator layer, cathode layer, and anode layer and allow them to travel along their designated direction; a plurality of spools to hold a separator roll, a cathode roll, and an anode roll; a plurality of holders including a first holder and a second holder for each separator section to pull down or hold the separator layer; a plurality of holders including a first holder and a second holder for each cathode section and anode section to pull down or hold the cathode layer and the anode layer; a plurality of clamps for each separator layer, cathode layer, and anode layer to stabilize the layers at the pre-set or pre-designated positions and locations; a plurality of cutters located on the frame for each cathode section and anode section to cut the cathode layer and the anode layer; a rotary heating device located at the side of rotary disc that can heat and seal the separator layers; and a transfer belt to move the stacked cell to the next process.

DESCRIPTION OF EMBODIMENTS OF THE INVENTION

Figure 1:
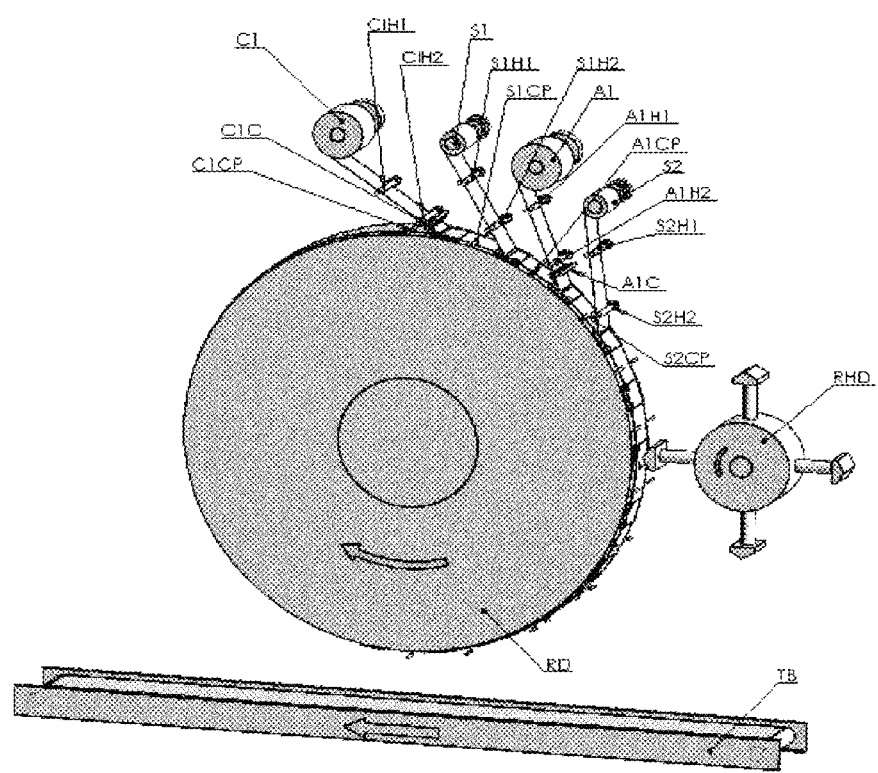
FIG. 1 is an embodiment of a continuous prismatic cell stacking system including a conveyer system, spools, first holders, cutters, second holders, clamps, and rotary heating device, which are mounted accordingly on a frame.

The detailed descriptions of the current invention set forth below in connection with the drawings and examples are preferred embodiments of the current invention and are not limited to represent the only embodiments and forms described hereinafter.

"Large format" Li-ion cells or batteries refer to cells or batteries having significant energy capacity or content in Ah. Large format cells are typically used in applications requiring a high quantity of cells such as electric vehicles (EV). If small format cells are used, the battery pack will be a plurality of single cells connected either in parallel or in series to meet both voltage and current demands. When the applications involve high energy and power demands such as in electric vehicles, it is common to choose the large format cells in order to reduce the complexity of the battery packing process due to electrical connections. Large formal cells also reduce the failure probability because there are much less individual cells connections in a battery pack or module. The energy and power needs for an electric vehicle are significantly larger than above-mentioned consumer electronic devices, usually in the range of 200-400 V and 100-500 Ah depending on the type of EV designed or chosen.

According to the current invention, four spools that include two separator layer spools, one cathode layer spool and one anode layer spool are only needed in this invention. According to another aspect of the current invention, the rotary disc (RD) design stacking system is able to reduce the quantity of the spools needed to make a multiple layer of the prismatic cell stack. For example, if the cell design is to have 11 cathode layers and 10 anode layers, the number of separator layers will be 22. Since the process is designed to have the first cathode layer placed onto a separator layer, there is always one more cathode layer than anode layer if the prismatic cell is designed to have more than one individual electrochemical cell inside. The rotary disc (RD) will rotate 12 times for this cell design before the stack is formed and then the stack will be dropped onto the transfer belt (TB) underneath the RD. The obvious advantage is that the current invention is able to use only four spools to successively make multiple stacks.

According to another aspect of current invention, the rotary disc system is a continuous prismatic cell stacking system and method that does not need a separate machine and process to cut the anode layer/cathode layer, or the fold machine to fold the separator layer. The system will significantly reduce the capital investment and space needed for building a large size battery plant.

According to another aspect of current invention, the rotary disc system can be easily adjusted for different production capacities and different sizes of prismatic cell manufacturing.

More specially, in one embodiment of the invention, a method of stacking a prismatic cell, includes:

(a) a rotary disc system, wherein the rotary disc is round shape, or multi-equilateral shape, or track & field shape;

(b) successively stacking said separator layer/cathode layer/separator layer/anode layer/separator layer so that each layer is supported in turn while it is being conveyed at high speed on the said rotary disc;

(c) engaging a cathode spool, separator spool, anode spool, and separator spool for stacking prismatic cells so that each separator layer, cathode layer, separator layer, anode layer, and separator layer can be placed on top of each other while being conveyed at high speed on the said rotary disc. The layer pattern is designed to have two separator layers at each end. In a preferred embodiment, a separator layer is between the cathode layer and the anode layer.

(d) engaging holders for each separator layer, cathode layer, and anode layer to push and place the said layer to pre-set or pre-designated positions and locations.

(e) engaging a clamp for each separator layer, cathode layer, and anode layer to stabilize the layers at the pre-set or pre-designated positions and locations.

(f) engaging a cutter for each cathode layer and anode layer.

(g) engaging a rotary heating device located at the side of rotary disc that can heat and seal the separator layers.

(h) engaging a transfer belt to move the stacked cell to the next process.

In another aspect, the current invention includes a prismatic cell stacking system comprising a rotary disc to support each one of a plurality of separator layer, cathode layer, and anode layer and allow them to travel along their designated direction; a plurality of spools to hold a separator roll, a cathode roll, and an anode roll; a plurality of holders including a first holder and a second holder for each separator section to pull down or hold the separator layer; a plurality of holders including a first holder and a second holder for each cathode section and anode section to pull down or hold the cathode layer and the anode layer; a plurality of clamps for each separator layer, cathode layer, and anode layer to stabilize the layers at the pre-set or pre-designated positions and locations; a plurality of cutters located on the frame for each cathode section and anode section to cut the cathode layer and the anode layer; a rotary heating device located at the side of rotary disc that can heat and seal the separator layers; and a transfer belt to move the stacked cell to the next process.

An embodiment of the current invention is described hereunder in details with reference to and is illustrated in FIG. 1. The legend used in FIG. 1 is defined as follows:

RD - - - Rotary Disc
TB - - - Transfer Belt
RHD - - - Rotary Heating Device
C1 - - - #1 Cathode Spool
C1H1 - - - First Holder of #1 Cathode Spool
C1H2 - - - Second Holder of #1 Cathode Spool
C1C - - - Cutter of #1 Cathode Spool
C1CP - - - Clamp of #1 Cathode Spool
S1 - - - #1 Separator Spool
S1H1 - - - First Holder of #1 Separator Spool
S1H2 - - - Second Holder of #1 Separator Spool
S1CP - - - Clamp of #1 Separator Spool
A1 - - - #1 Anode Spool
A1H1 - - - First Holder of #1 Anode Spool
A1H2 - - - Second Holder of #1 Anode Spool
A1C - - - Cutter of #1 Anode Spool
A1CP - - - Clamp of #1 Anode Spool
S2 - - - #2 Separator Spool
S2H1 - - - First Holder of #2 Separator Spool
S2H2 - - - Second Holder of #2 Separator Spool
S2CP - - - Clamp of #2 Separator Spool In this embodiment (FIG. 1) a prismatic cell stacking system is provided with the following functions to stack a plurality of prismatic cells sequentially or continuously:

Example 1

System Startup to Get a Separator Layer/Cathode Layer/Separator Layer/Anode Layer/Separator (S-C-S-A-S) Basic Unit Stacked At the beginning of stacking process, there is only one separator section operated at the first cycle to place separator on the top of rotary disc. The separator spool (S1) and a first holder (S1H1) and a second holder (S1H2) are operated simultaneously. The spool (S1), first holder (S1H1), and second holder (S1H2) will be operated continuously and place the first separator layer for stacking.

A rotary disc (RD) rotates and the first separator layer is moved by a second holder (S1H2) onto the rotary disc (RD) where the holders will hold the first separator layer on the rotary disc (RD). During the second cycle of operation, a first cathode spool (C1) with a clamp (C1CP), a first holder (C1H1) and a second holder (C1H2) will operate simultaneously and set the cathode layer to the designated position. A cutter (C1C) will cut the cathode layer from the cathode roll to be placed on top of the incoming separator layer.

The first separator layer and first cathode layer will be moved for the second separator stacking. During this period, the separator spool (S1), first holder (S1H1), and second holder (S1H2) are operated simultaneously. The spool (S1), first holder (S1H1) and second holder (S1H2) will be operated continuously and place the second separator layer on the top of cathode for stacking.

After the second separator layer is placed, the rotary disc (RD) will move the prismatic cell into the position for placing the first anode layer. During this period, the first anode spool (A1) with a clamp (A1CP), a first holder (A1H1) and a second holder (A1H2) are operated simultaneously and set a first anode layer to the pre-designed position. Cutter (A1C) will cut the anode layer off from anode roll to be placed on top of the second separator layer.

After the anode layer is placed, the rotary disc (RD) will move the prismatic cell into the position for placing the third separator layer. The second separator spool section starts operation. The separator spool (S2), first holder (S2H1), and second holder (S2H2) are operated simultaneously. The spool (S2), first holder (S2H1), and second holder (S2H2) will be operated continuously and place the third separator layer on the top of anode for stacking.

The above-described process may be sequentially repeated for stacking a designed prismatic cell. If the cell design is to have 11 cathode layers and 10 anode layers, the number of separator layers will be 22. Since the process is designed to have the first cathode layer placed onto a separator layer, there is always one more cathode layer than anode layer if the prismatic cell is designed to have more than one individual electrochemical cell inside. The rotary disc (RD) will rotate 12 times before the cell stack is dropped onto the transfer belt (TB) through rotary heating device (RHD). Separator spool (S1) will be the first and the last spool to provide the first and the final layers in the cell stack. Thus, the prismatic cells have a separator layer at each end.

A rotary heating device (RHD) will heat and seal many separator layers along with the two edges of the cell stack.

After the rotary heating device (RHD) process is completed, the rotary disc (RD) will drop the prismatic cells onto the transfer belt (ITB) for next procedure.

Figure 2:
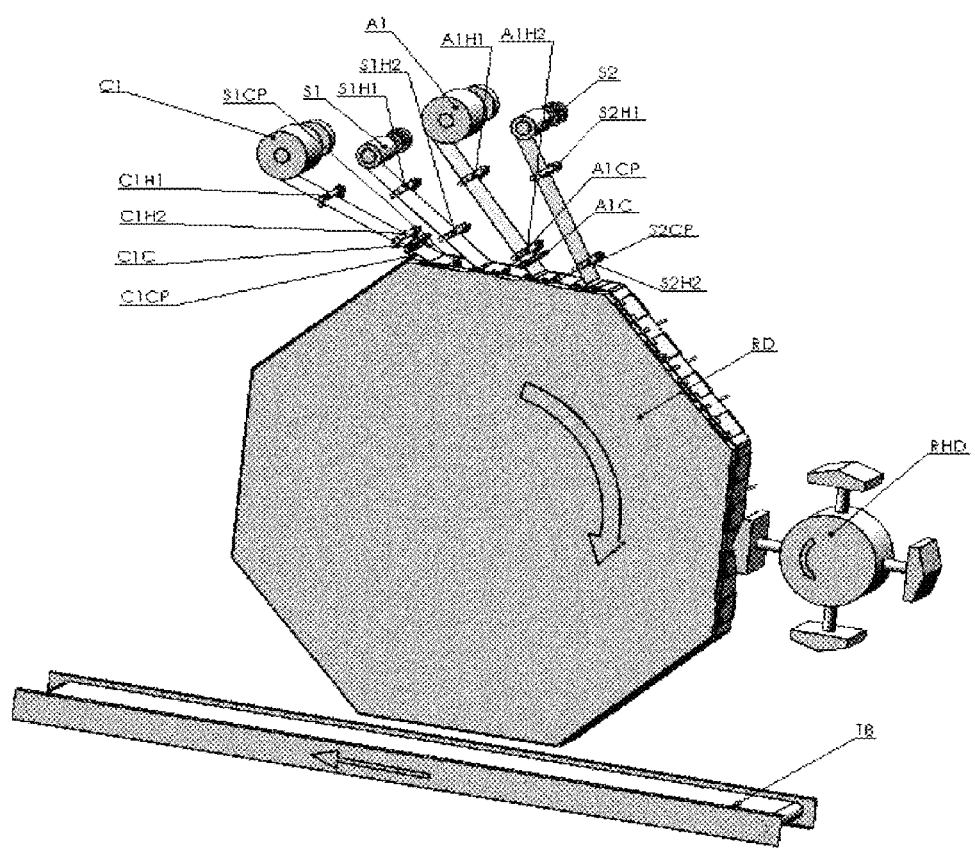
FIG. 2 is another embodiment of a multi-equilateral rotary disc.

In another embodiment of the current invention, the rotary disc (RD) is in a multi-equilateral shape, as shown in FIG. 2.

Figure 3:
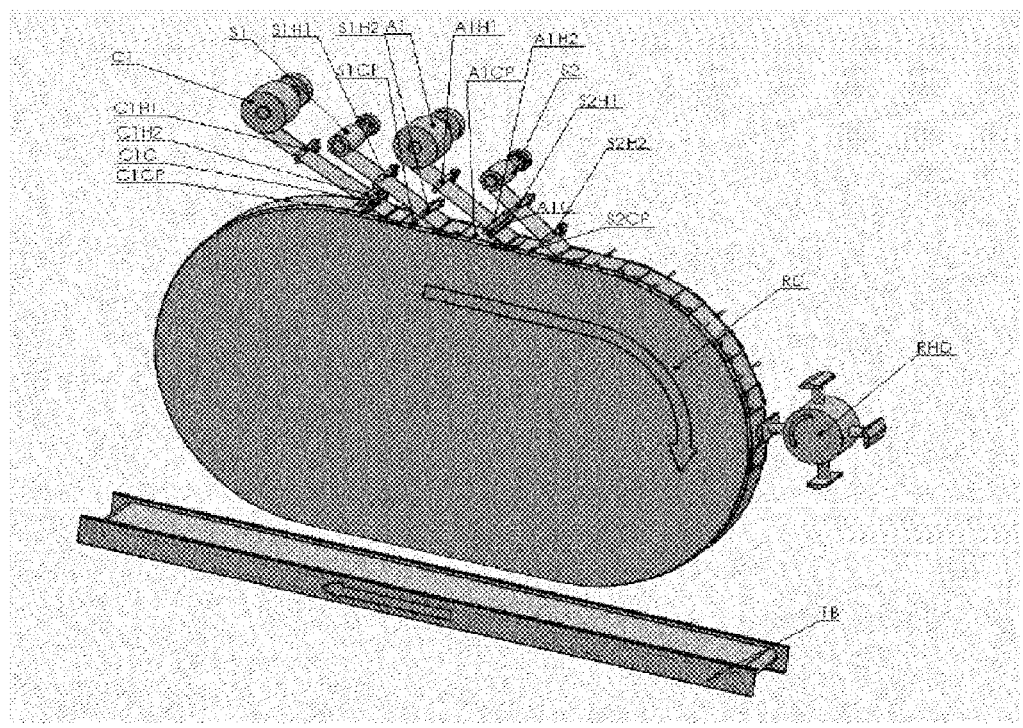
FIG. 3 is another embodiment of a track & field shape rotary disc.

In another embodiment of the current invention, the rotary disc (RD) is in a track & field shape, as shown in FIG. 3.

Future system in process to weld and pack prismatic batteries simultaneously: upon placing of the last separator layer, the transfer belt (TB) positions the cell stack within a cell termination ultrasonic weld station. Aluminum or other chosen metal current collector termination material will be fed from roll stock, cut to length and position upon the uncoated exposed electrode (cathode or anode) towards the outer edge of the transfer belt (TB) where a series of ultrasonic welds penetrate and weld the stacked cathode or anode layers together, welding them to the termination material. The electrode stack is then turned in the plane of the conveyer 180° and the material feed, cutting, positioning and weld sequence is repeated for the other electrode (cathode or anode).

Various modifications in structure and/or function may be made by one skilled in the art to the disclosed embodiments without departing from the scope of the invention as described above and defined by the claims.

What is claimed is:

1. A method of forming a battery stack comprising a plurality of stacked prismatic cell layers, comprising:
   rotating a rotary disc from a first position to a plurality of stacking stations,
      wherein the rotary disc is operable to make a complete rotation in a single direction,
      wherein the rotary disk operates to support at least one of the plurality of prismatic cell layers,
      wherein the plurality of prismatic cell layers comprises at least one cut prismatic cell layer and at least one continuous separator layer;
   collecting a first cut prismatic cell layer or a first continuous separator layer onto the rotary disc to form a first battery stack;
   collecting the first cut prismatic cell layer, the first continuous separator layer, a second cut prismatic cell layer, or a second continuous separator layer onto the first battery stack to form a second battery stack;
   collecting the first cut prismatic cell layer, the first continuous separator layer, the second cut prismatic cell layer, or the second continuous separator layer onto the second battery stack to form a third battery stack,
      wherein the first cut prismatic cell layer and the second cut prismatic cell layer are selected from an anode layer and a cathode layer, and
   rotating the rotary disc in the single direction such that the third battery stack is transported to or past the first position.

2. The method of claim 1, further comprising heating the second battery stack or the third battery stack to form an adhered battery stack.

3. The method of claim 1, wherein collecting the first continuous separator layer or collecting the second continuous separator further comprises:
   engaging a spool consisting of a continuous sheet of a separator layer;
   engaging a holder to push and place the separator layer to pre-set positions; and
   engaging a clamp to stabilize the separator layer in the pre-set positions.

4. The method of claim 1, wherein collecting the first cut prismatic cell layer or collecting the second cut prismatic cell layer further comprises:
   engaging a spool consisting of a continuous sheet of the prismatic cell layer;
   engaging a holder to push and place the prismatic cell layer to pre-set positions;
   engaging a clamp to stabilize the prismatic cell layer in the pre-set positions; and
   engaging a cutter to form the first cut prismatic cell layer or the second cut prismatic cell layer.

5. The method of claim 1, further comprising:
   rotating the rotary disk such that the third battery stack is transported to the plurality of stacking stations;
   collecting the second cut prismatic cell layer, the second continuous separator layer, the third cut prismatic cell layer, or the third continuous separator layer onto the third battery stack to form a fourth battery stack;
   collecting the second cut prismatic cell layer, the second continuous separator layer, the third cut prismatic layer, the third continuous separator layer, a fourth cut prismatic cell layer, or a fourth continuous separator layer onto the fourth battery stack to form a fifth battery stack;
   collecting the second cut prismatic cell layer, the second continuous separator layer, the third cut prismatic cell layer, the third continuous separator layer, the fourth cut prismatic cell layer, or the fourth continuous separator layer onto the fifth battery stack to form a sixth battery stack; and
      wherein the sixth battery stack comprises at least the first continuous separator layer and the second continuous separator layer, and
      wherein the second cut prismatic cell layer, the third cut prismatic cell layer, and the fourth cut prismatic cell layer are selected from the anode layer and the cathode layer.

6. The method of claim 5,
   wherein the sixth battery stack consists of the first continuous separator layer, the first cut prismatic cell layer, the second continuous separator layer, the third continuous separator layer, the second cut prismatic cell layer, and the fourth continuous separator layer;
   wherein the first cut prismatic cell layer comprises the anode layer; and
   wherein the second cut prismatic cell layer comprises the cathode layer.

7. The method of claim 5, further comprising heating the sixth battery stack to form an adhered sixth battery stack.

8. The method of claim 7, further comprising cutting the adhered sixth battery stack to form a final battery stack.

9. The method of claim 8, further comprising engaging a transfer belt to transport the final battery stack.

10. The method of claim 1, wherein the rotary disk further comprises a round shape, a multi-equilateral shape, or a track & field shape.

11. The method of claim 1, wherein the rotary disc and the plurality of stacking stations are arranged such that the rotary disc rotates in a vertical plane.

12. A method of forming a battery stack comprising a plurality of stacked prismatic cell layers, comprising:
   rotating a rotary disc from a first position to a plurality of stacking stations,
      wherein the rotary disc is operable to make a complete rotation in a single direction,
      wherein the rotary disk operates to support at least one of the plurality of prismatic cell layers,
      wherein the plurality of prismatic cell layers comprises at least one cut prismatic cell layer and at least one continuous separator layer;
   collecting a first cut prismatic cell layer or a first continuous separator layer onto the rotary disc to form a first battery stack;
   collecting the first cut prismatic cell layer, the first continuous separator layer, a second cut prismatic cell layer, or a second continuous separator layer onto the first battery stack to form a second battery stack;
   collecting the first cut prismatic cell layer, the first continuous separator layer, the second cut prismatic cell layer, or the second continuous separator layer onto the second battery stack to form a third battery stack,
      wherein the first cut prismatic cell layer and the second cut prismatic cell layer are selected from an anode layer and a cathode layer, and
   rotating the rotary disc in the single direction such that the third battery stack is transported to or past the first position to the plurality of stacking stations;
   collecting the second cut prismatic cell layer, the second continuous separator layer, the third cut prismatic cell layer, or the third continuous separator layer onto the third battery stack to form a fourth battery stack;
   collecting the second cut prismatic cell layer, the second continuous separator layer, the third cut prismatic layer, the third continuous separator layer, a fourth cut prismatic cell layer, or a fourth continuous separator layer onto the fourth battery stack to form a fifth battery stack; and collecting the second cut prismatic cell layer, the second continuous separator layer, the third cut prismatic cell layer, the third continuous separator layer, the fourth cut prismatic cell layer, or the fourth continuous separator layer onto the fifth battery stack to form a sixth battery stack, wherein the sixth battery stack comprises at least the first continuous separator layer and the second continuous separator layer, and wherein the second cut prismatic cell layer, the third cut prismatic cell layer, and the fourth cut prismatic cell layer are selected from the anode layer and the cathode layer.

13. The method of claim 12,
wherein the sixth battery stack consists of the first continuous separator layer, the first cut prismatic cell layer, the second continuous separator layer, the third continuous separator layer, the second cut prismatic cell layer, and the fourth continuous separator layer;

wherein the first cut prismatic cell layer comprises the anode layer; and wherein the second cut prismatic cell layer comprises the cathode layer.

14. The method of claim 12, further comprising heating the sixth battery stack to form an adhered sixth battery stack.

15. The method of claim 14, further comprising cutting the adhered sixth battery stack to form a final battery stack.

16. The method of claim 15, further comprising engaging a transfer belt to transport the final battery stack.

17. The method of claim 12, wherein the rotary disk further comprises a round shape, a multi-equilateral shape, or a track & field shape.

* * * * *